United States Patent
Le Floch et al.

(10) Patent No.: US 10,404,991 B2
(45) Date of Patent: Sep. 3, 2019

(54) METHOD OF DISPLAYING A REGION OF INTEREST IN A VIDEO STREAM

(71) Applicant: CANON KABUSHIKI KAISHA, Tokyo (JP)

(72) Inventors: Hervé Le Floch, Rennes (FR); Frédéric Maze, Langan (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 14/761,575

(22) PCT Filed: Jan. 15, 2014

(86) PCT No.: PCT/EP2014/050704
§ 371 (c)(1),
(2) Date: Jul. 16, 2015

(87) PCT Pub. No.: WO2014/111423
PCT Pub. Date: Jul. 24, 2014

(65) Prior Publication Data
US 2015/0365687 A1  Dec. 17, 2015

(30) Foreign Application Priority Data
Jan. 18, 2013 (GB) .................................. 1300950.1

(51) Int. Cl.
*H04N 11/02* (2006.01)
*H04N 7/12* (2006.01)
(Continued)

(52) U.S. Cl.
CPC ........... *H04N 19/33* (2014.11); *H04N 19/162* (2014.11); *H04N 19/17* (2014.11); *H04N 19/184* (2014.11);
(Continued)

(58) Field of Classification Search
None
See application file for complete search history.

(56) References Cited

U.S. PATENT DOCUMENTS 5,995,150 A * 11/1999 Hsieh ..................... H04N 7/148
348/E7.082
2003/0072375 A1* 4/2003 Soundararajan ............................
H04N 21/234327
375/240.25
(Continued)

FOREIGN PATENT DOCUMENTS

| EP | 1335603 A2 | 8/2003 |
|---|---|---|
| WO | 2009/014230 A1 | 1/2009 |
| WO | 2012/168365 A1 | 12/2012 |

OTHER PUBLICATIONS

Mavlankar et al., "Optimal Slice Size for Streaming Regions of High Resolution Video With Virtual Pan/Tilt/Zoom Functionality", 15th European Signal Processing Conference (EUSIPCO 2007), Poznan, Poland, Sep. 3-7, 2007, pp. 1275-1279.
(Continued)

*Primary Examiner* — Talha M Nawaz
(74) *Attorney, Agent, or Firm* — Canon U.S.A., Inc. IP Division

(57) ABSTRACT

A method of processing video data comprising subdividing a video stream into image portions, encoding the image portions with high resolution in respective encoded video streams and reassembling a selection of encoded video streams in order to display a region of interest with high resolution. Embodiments of the invention provide high resolution display of specific region of interest without a priori knowledge of the position of the region of interest.

19 Claims, 14 Drawing Sheets

Figure 3A:
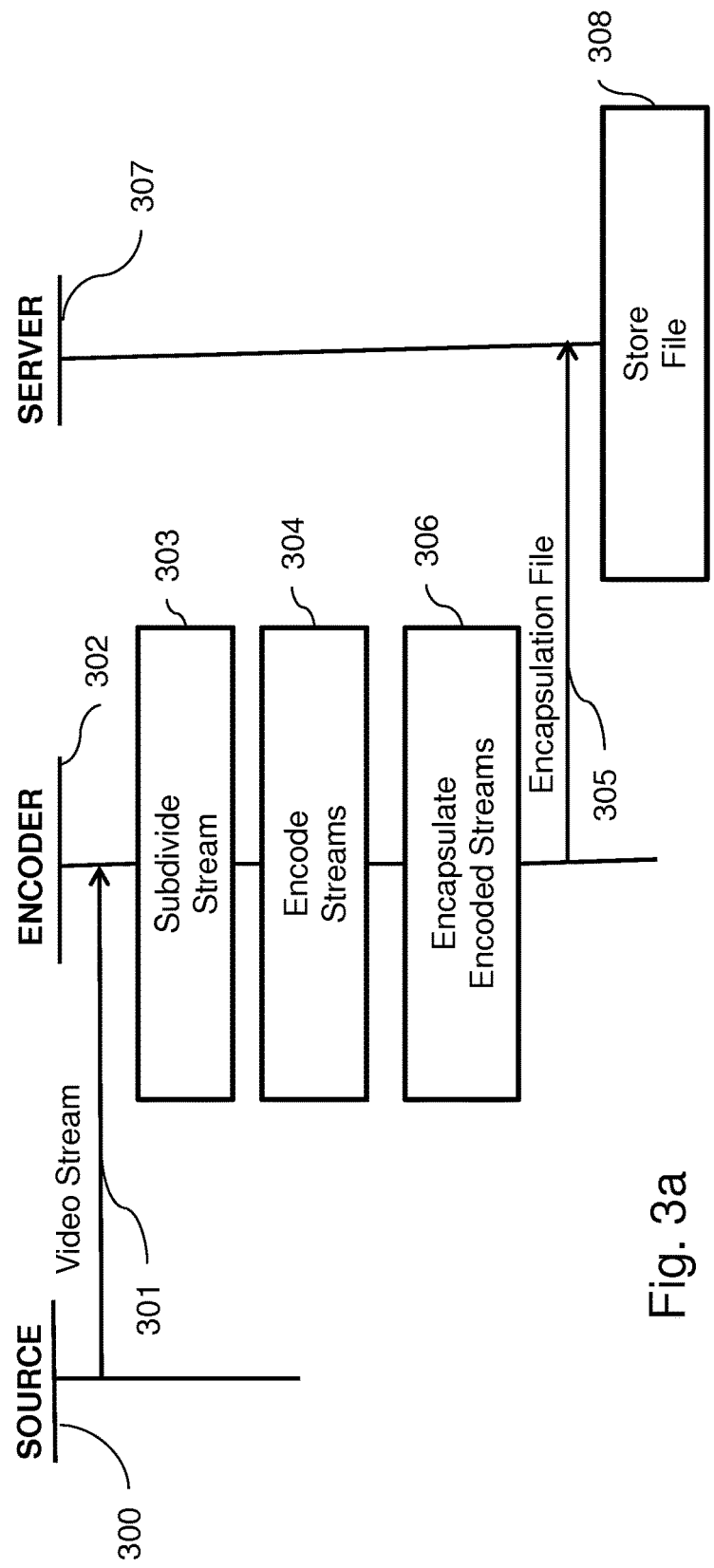

(51) Int. Cl.
H04N 11/04 (2006.01)
H04N 19/33 (2014.01)
H04N 21/2343 (2011.01)
H04N 21/4728 (2011.01)
H04N 21/854 (2011.01)
H04N 19/17 (2014.01)
H04N 19/162 (2014.01)
H04N 19/36 (2014.01)
H04N 19/184 (2014.01)

(52) U.S. Cl.
CPC ..... *H04N 19/36* (2014.11); *H04N 21/234327* (2013.01); *H04N 21/234345* (2013.01); *H04N 21/234363* (2013.01); *H04N 21/4728* (2013.01); *H04N 21/85406* (2013.01)

(56) References Cited

U.S. PATENT DOCUMENTS

| | | | | |
|---|---|---|---|---|
| 2006/0256851 | A1* | 11/2006 | Wang | H04N 21/234327 375/240.01 |
| 2007/0024706 | A1* | 2/2007 | Brannon, Jr. | H04N 7/17318 348/142 |
| 2007/0133675 | A1* | 6/2007 | Honda | H04N 21/234327 375/240.1 |
| 2013/0259114 | A1 | 10/2013 | Carlsson et al. | |
| 2013/0307942 | A1* | 11/2013 | Dini | H04N 5/44591 348/51 |
| 2014/0079126 | A1* | 3/2014 | Ye | H04N 19/105 375/240.16 |
| 2016/0029091 | A1* | 1/2016 | Le Floch | H04N 21/234345 375/240.26 |

OTHER PUBLICATIONS

Mavlankar et al., "Peer-To-Peer Multicast Live Video Streaming With Interactive Virtual Pan/Tilt/Zoom Functionality", Image Processing, 2008, 15th IEEE International Conference, Oct. 12, 2008, pp. 2296-2299.

Khiem et al., "Supporting Zoomable Video Streams with Dynamic Region-of-Interest Cropping", Proceedings of the First Annual ACM SIGMM Conference on Multimedia Systems, MMSYS '10, Feb. 22, 2010, pp. 259-270.

Amon et al., "File Format for Scalable Video Coding", IEEE Transactions on Circuits and Systems for Video Technology, vol. 17, No. 9, Sep. 1, 2007, pp. 1174-1185.

Wu, et al., "Some extensions to ISO Base Media File Format and MPEG-2 Transport Stream to support multi-component media content HTTP Streaming", International Organisation for Standardisation ISO/IEC JTC1/SC29/WG11, Coding of Moving Pictures and Audio, MPEG2010/M17894, Jul. 2010, Geneva, Switzerland, pp. 1-15.

Le Feuvre, et al., "Inputs to WD of 14496-15 AMD2", International Organisation for Standardisation ISO/IEC JTC1/SC29/WG11, Coding of Moving Pictures and Audio, MPEG2013/M31439, Oct. 2013, Geneva (CH), pp. 1-7.

Le Feuvre, et al., "Support for efficient tile access in the HEVC File Format", International Organisation for Standardisation ISO/IEC JTC1/SC29/WG11, Coding of Moving Pictures and Audio, MPEG2012/M29231, Apr. 2013, Incheon (KR), pp. 1-11.

Le Feuvre, et al., "Describing HEVC Tiles in ISOBMFF", International Organisation for Standardisation ISO/IEC JTC1/SC29/WG11, Coding of Moving Pictures and Audio, MPEG2013/M30294, Jul. 2013, Vienna (AT), pp. 1-4.

Le Feuvre, et al., "Coding Dependencies Signaling in ISOBMFF", International Organisation for Standardisation ISO/IEC JTC1/SC29/WG11, Coding of Moving Pictures and Audio, MPEG2013/M30293, Jul. 2013, Vienna (AT), pp. 1-4.

Le Feuvre, et al., "TuC on ordered combination of separate tracks and HEVC Tile Tracks", International Organisation for Standardisation ISO/IEC JTC1/SC29/WG11, Coding of Moving Pictures and Audio, N13956, Nov. 2013, Geneva, Switzerland, pp. 1-7.

* cited by examiner

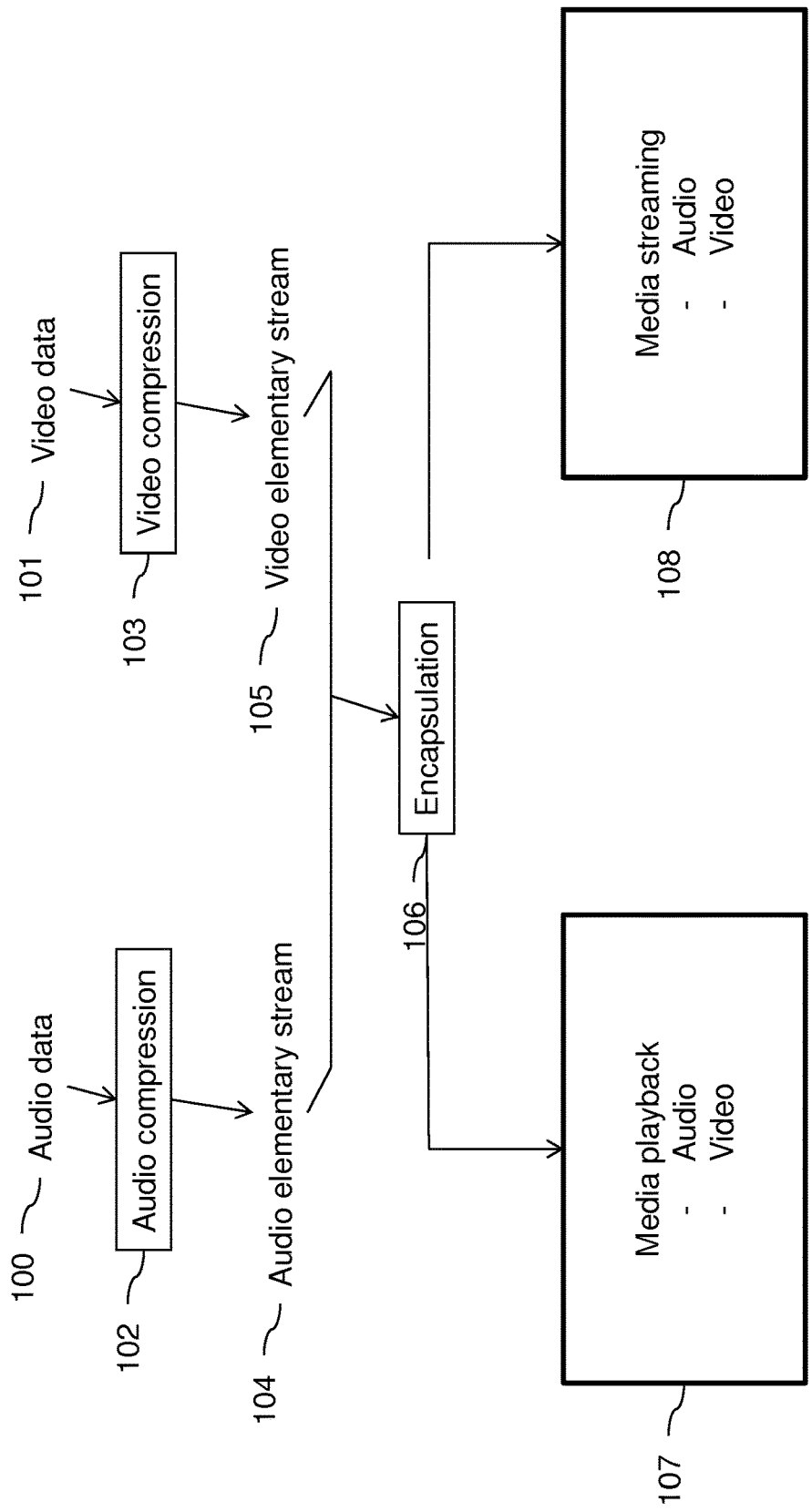

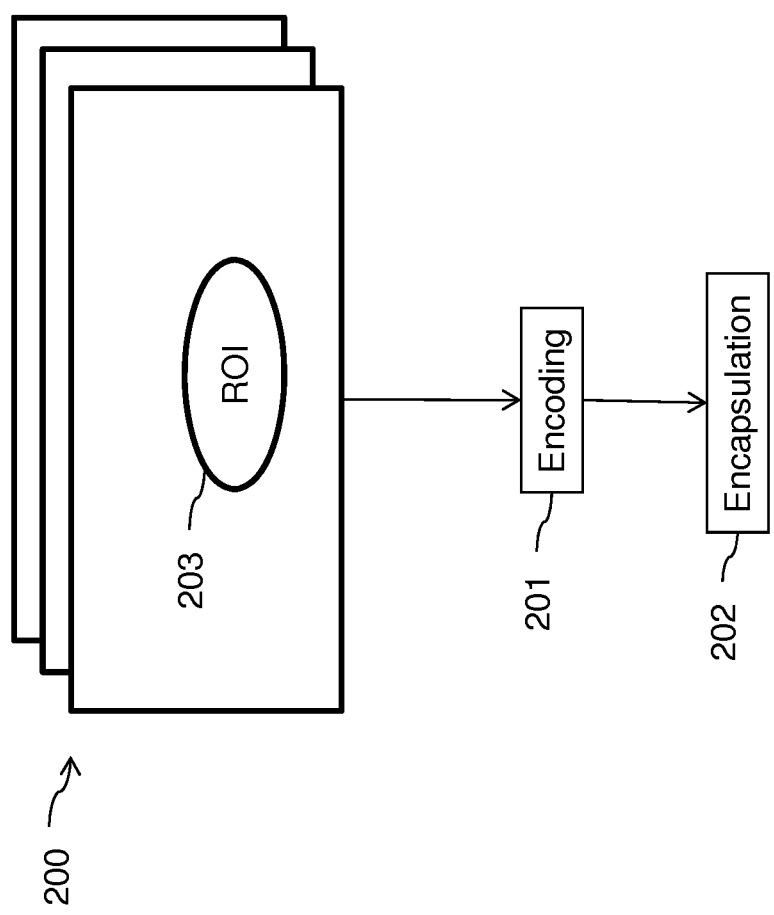

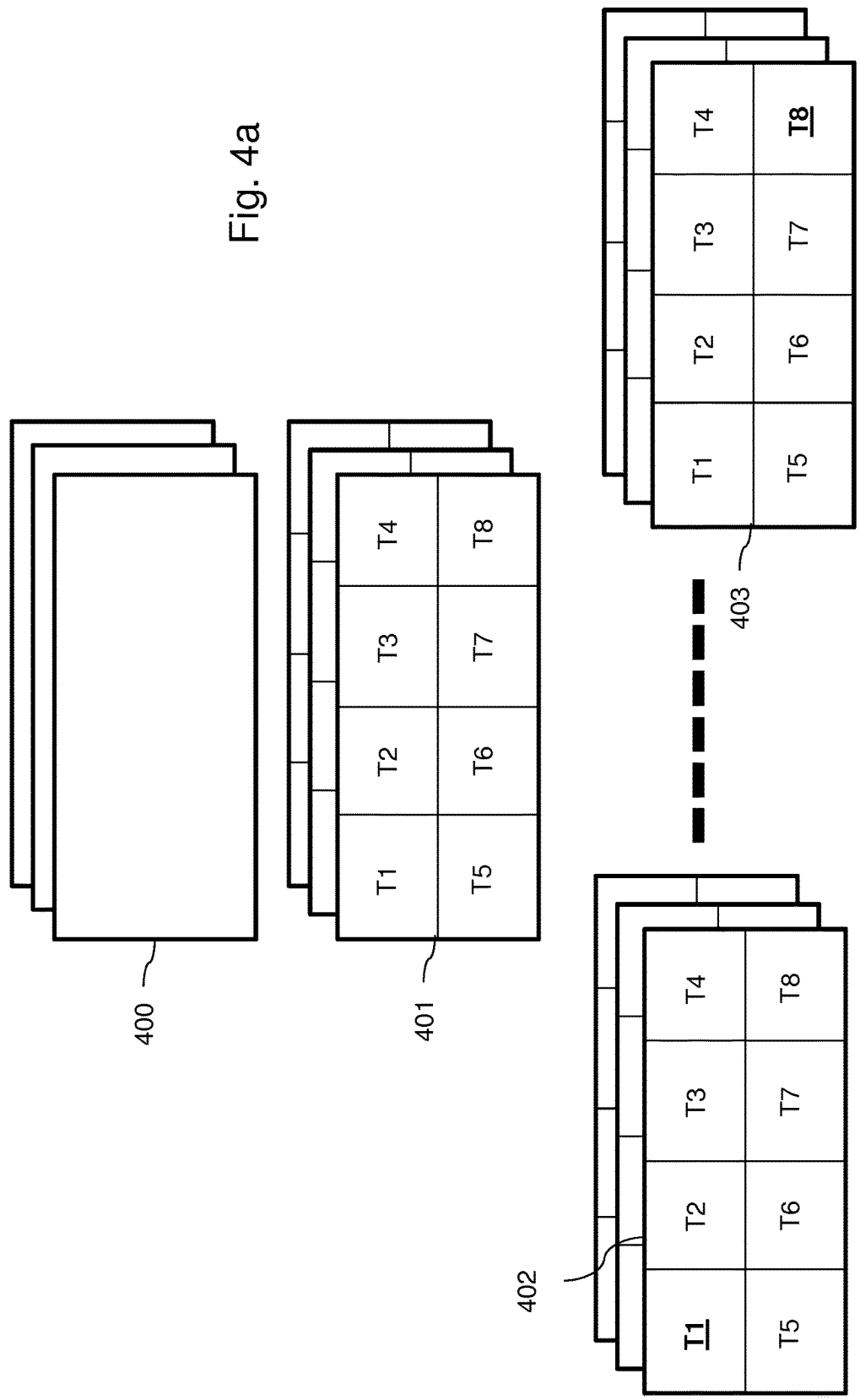

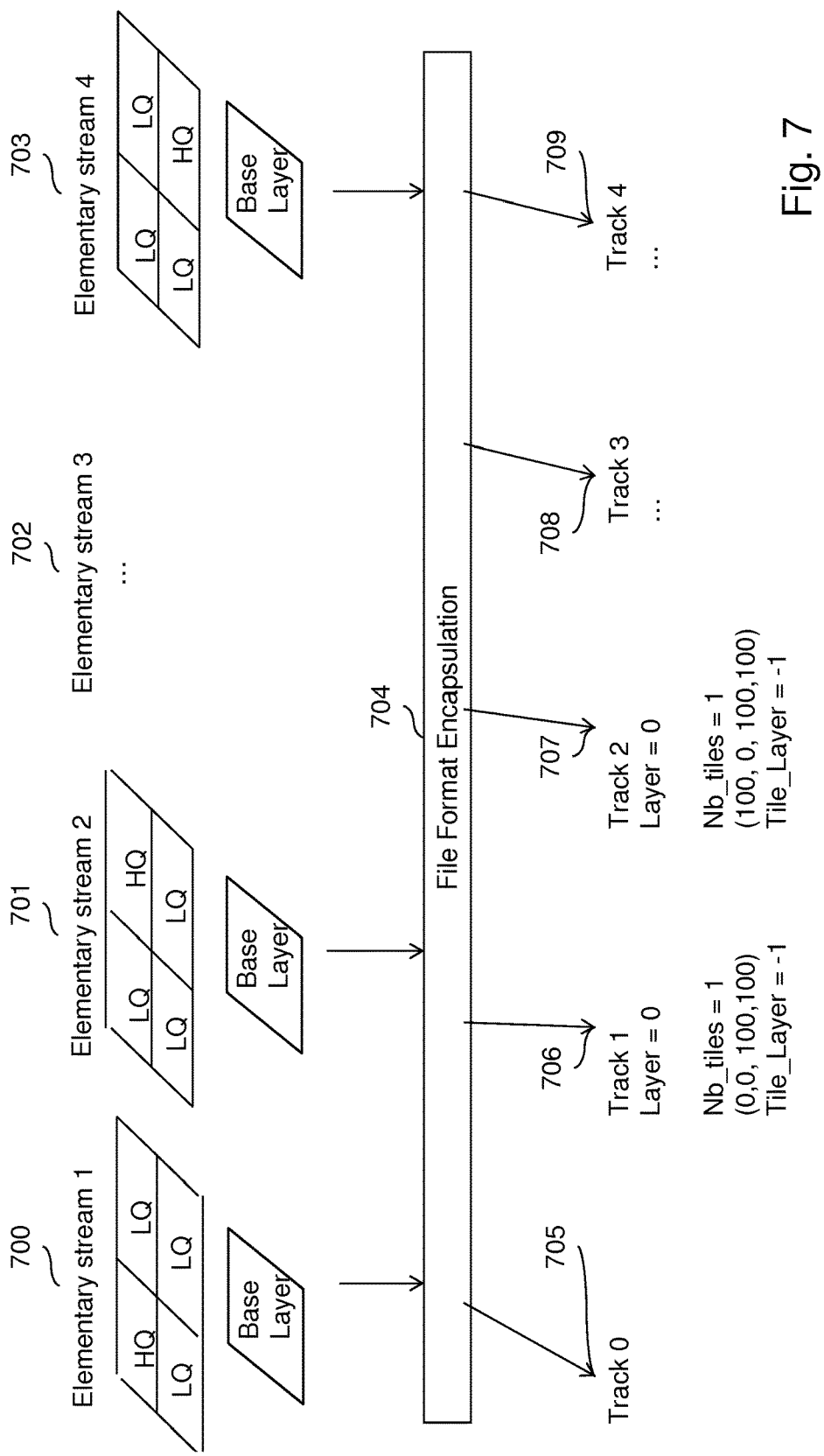

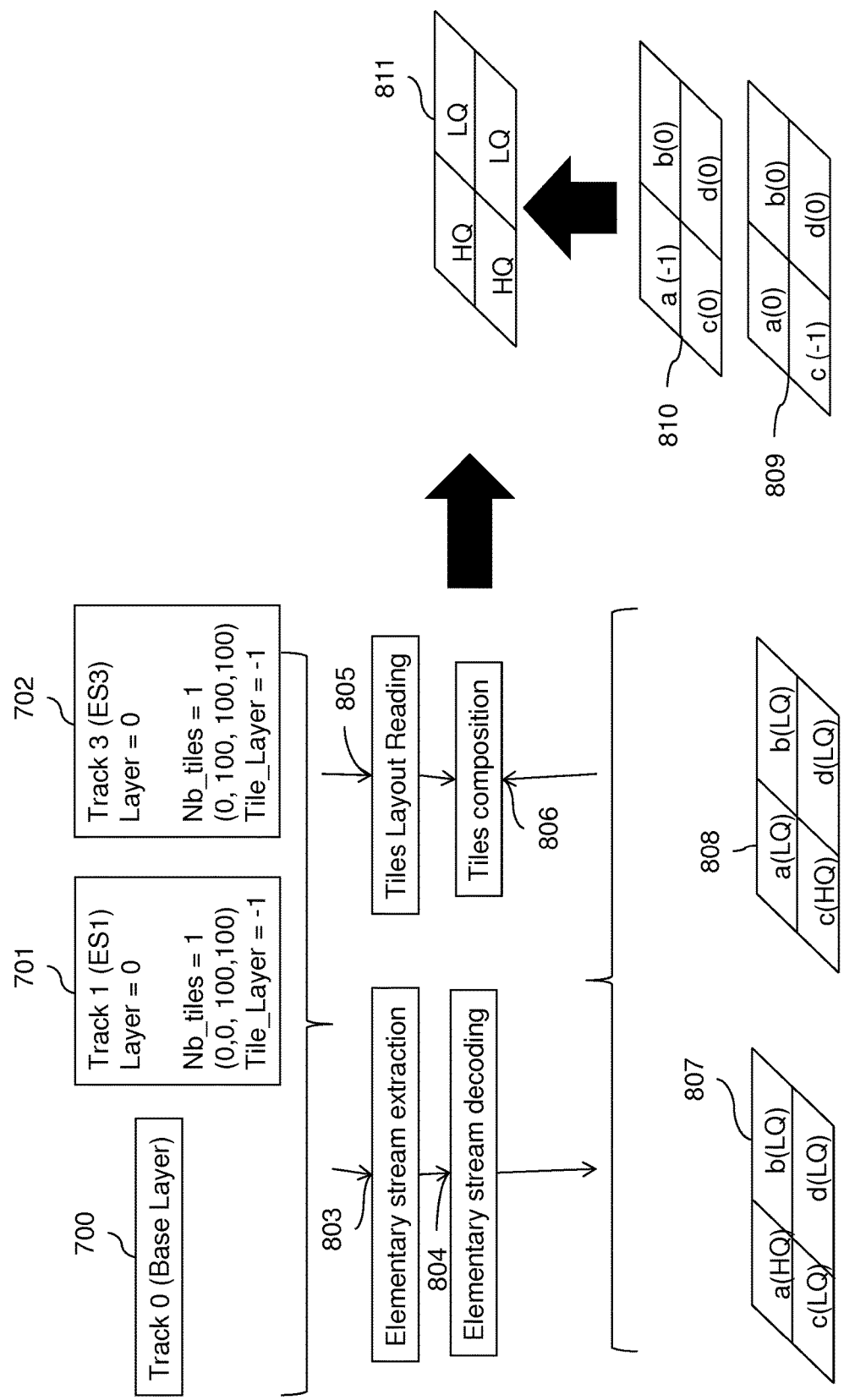

METHOD OF DISPLAYING A REGION OF INTEREST IN A VIDEO STREAM

CROSS-REFERENCE TO RELATED APPLICATIONS

This application is the National Phase application of PCT Application No. PCT/EP2014/050704, filed on Jan. 15, 2014 and titled "Method of displaying a region of interest in a video stream." This application claims the benefit under 35 U.S.C. § 119(a)-(d) of United Kingdom Patent Application No. GB1300950.1, filed on Jan. 18, 2013. The above cited patent applications are incorporated herein by reference in their entirety.

The present invention relates to video data processing for video streaming.

In particular, the present invention relates to video data processing making it possible to display a portion of images of a video stream with a higher quality than the other portions of the images.

Video streaming is illustrated in FIG. 1.

Audio data and video data are acquired during respective steps 100 and 101. The audio data are compressed during a step 102 using a compression algorithm such as MP3. In parallel, video data are compressed during a step 103 using algorithms such as MPEG4, AVC, HEVC, SVC. Once compression has been performed, audio and video elementary streams 104 and 105 are respectively obtained.

Next, during a step 106, the elementary streams are encapsulated into an encapsulation file as a global media presentation. For example, the ISO BMFF standard (acronym for ISO Base Media File format), or its extension to AVC, SVC, HEVC may be used for describing as the content of the encoded audio and video elementary streams a global media presentation. The encapsulation file may contain:

media data (the audio and video elementary streams), and
metadata describing the media data.

The encapsulated file can be used directly for a local playback during step 107. It can also be streamed over a network during step 108. For example, DASH (acronym for Dynamic Adaptive Streaming over HTTP) can be used as a streaming protocol.

A need exists for easily displaying with better quality spatial sub-parts of a video. This functionality is illustrated in FIG. 2. This figure shows frames 200 of a video stream. For example, the video stream is the output of a camera sensor. The video stream is encoded during a step 201 and the encoded video stream is encapsulated during a step 202 into a container (encapsulation file). The container is a file containing the elementary stream (media data) and a description of the elementary stream (metadata).

One solution to display a high quality spatial sub-part of a video on a end user display is to transmit the full video with quality to the end user receiver device. However, in case of UHD (Ultra High Definition) video, transmitting the full video stream requires a high bitrate that may not be supported by the receiver displaying the video on the display.

The end user may though select a region of interest of the video stream (ROI) 203 and make request for receiving and displaying the ROI with a quality higher than the other parts of the video (the other parts being received and displayed with a basic quality).

For example, the ROI may be encoded with the same spatial resolution than the remainder of the video but with a higher quality. Also, the whole video may be spatially up-sampled with complementary details for improving the visual rendering of the ROI. However, due to the initial encoding in step 201, implementation of this functionality is difficult.

Encoding the whole initial video stream with high quality and transcoding the video when the ROI is known necessitates performing highly complex computations.

Streaming the pixels of the ROI with a high quality, when the ROI is known in advance, requires data extraction from the encapsulation file, transcoding and a new encapsulation. These operations are complex and necessitate a large amount of processing resources. Also, having a ROI set once and for all in advance cannot give the user the opportunity to select dynamically the ROI.

Thus, there is need for enhancing video streaming so as to make it possible to display a ROI of a video stream with a better quality.

A first aspect of the invention relates to a method of processing a video stream for encapsulation into an encapsulation file, the method comprising the following steps:

obtaining a subdivided video stream, wherein each image of the video stream is subdivided into a plurality of image portions, and wherein the images of the video stream are subdivided according to a same subdivision grid, encoding the video stream as a plurality of encoded video streams, each encoded video stream comprising encoded images with at least one same respective image portion of the subdivision grid encoded with a higher resolution than the other image portions of the subdivision grid, and encapsulating the plurality of encoded video streams into an encapsulation file, each image portion of the encapsulated encoded video streams being associated with a resolution level data indicating a level of resolution with which said each image portion is encoded.

A method according to the first aspect make it possible to stream a ROI either predefined (i.e. already know during encoding) arbitrary defined by a end user.

Thus, any region of interest in the video stream can be reassembled in order to be displayed with high resolution. The region of interest can be unknown during encoding.

The encapsulation file provided makes it possible to simplify the processing needed for generating video data for enhanced display of a region of interest.

The resolution level data may comprise a superimposition data indicating a position of the data portion in a superimposition of image layers.

Therefore, reassembling of the region of interest may comprise superimposing frames of the encoded video streams of the plurality. According to the superimposition data, image portions with high resolution are displayed or not.

High resolution may be understood as high spatial resolution wherein the number of pixels of the high resolution image portions is higher than the number of pixels in the low resolution image portions (for example VGA, HD, UHD or other kind of spatial resolution). High resolution may also be understood as high image quality without any difference in terms of number of pixels between high resolution image portions and low resolution image portions.

For example, each image portion of the encapsulated encoded video stream is associated with a location information indicating a position of the image portion in the subdivision grid.

Therefore, the encoded video streams needed for displaying the region of interest with high resolution may be easily identified.

For example, said location information comprises:
coordinates of a starting point of the at least one same respective image portion, and
dimension information representing a dimension of said at least one same respective image portion.

Thus, encapsulation file format currently existing may be adapted for implementation of methods according to the first aspect.

The method may further comprise encapsulating, into said encapsulation file, said subdivided video stream encoded with a low resolution.

Thus, non-scalable encoding may be used.

For example, each one of the plurality of encoded video streams is encoded with a base layer with a low resolution and an enhancement layer with said images with at least one same respective image portion of the subdivision grid encoded with a higher resolution than the other image portions of the subdivision grid.

Thus, scalable encoding may be used.

The base layer may be the same for the plurality of encoded video streams.

A second aspect of the invention relates to a method of processing an encapsulation file for streaming video data, the method comprising the following steps:
obtaining a request for enhanced displaying of a region of interest in images of a video stream with a higher resolution than the remainder of said images,
accessing an encapsulation file comprising encapsulated encoded video streams, encoded from a common subdivided video stream, wherein each image of each encoded video stream is subdivided into a plurality of image portions according to a same subdivision grid, wherein each encoded video stream comprises encoded images with at least one same respective image portion of said subdivision grid encoded with a higher resolution than the other image portions of the subdivision grid, and wherein each image portion of the at least one encoded video stream is associated with a resolution level data indicating a level of resolution with which the image portion is encoded,
determining at least one image portion corresponding to said region of interest, and
transmitting at least one encapsulated encoded video stream corresponding to the at least one image portion determined.

The method according to the second aspect makes it possible to stream video data while outputting high resolution data on demand for requested regions of interest.

For example, said resolution level data comprises a superimposition data indicating a position of the data portion in a superimposition of image layers.

For example, each image portion of the encapsulated encoded video stream is associated with a location information indicating a position of the image portion in the subdivision grid.

For example, said location information comprises:
coordinates of a starting point of the at least one same respective image portion, and
dimension information representing a dimension of said at least one same respective image portion.

For example, there is encapsulated, into said encapsulation file, said common subdivided video stream encoded with a low resolution, the method further comprising streaming said common subdivided video stream encoded with a low resolution.

For example, each one of the plurality of encoded video streams is encoded with a base layer with a low resolution and an enhancement layer with said images with at least one same respective image portion of the subdivision grid encoded with a higher resolution than the other image portions of the subdivision grid.

For example, said base layer is the same for the plurality of encoded video streams.

A third aspect of the invention relates to a method of processing video data for displaying a video stream, the method comprising the following steps:
transmitting to a streaming server, a request for enhanced displaying of a region of interest in images of a video stream with a higher resolution than the remainder of said images,
receiving at least one encapsulation file comprising at least one encapsulated encoded video stream, wherein each image of each at least one encoded video stream is subdivided into a plurality of image portions according to a same subdivision grid, wherein each at least one encoded video stream comprises encoded images with at least one same respective image portion of said subdivision grid encoded with a higher resolution than the other image portions of the subdivision grid, and wherein said at least one same respective image portion of said subdivision grid corresponds to said region of interest, each image portion of the at least one encoded video stream being associated with a resolution level data indicating a level of resolution with which said each image portion is encoded,
decoding said at least one encapsulated encoded video stream received, and
generating, based on at least one video stream obtained by said decoding and the resolution level data associated with the image portions therein, a video signal, wherein resolution in said region of interest in the images is higher than in the remainder of the images.

Thus, regions of interest with high resolution may be requested on demand without necessitating complex data processing.

For example, said resolution level data comprises a superimposition data indicating a position of the data portion in a superimposition of image layers.

For example, each image portion of the encapsulated encoded video stream is associated with a location information indicating a position of the image portion in the subdivision grid.

For example, a plurality of encoded video streams are received, the method further comprising combining the plurality of video streams obtained by said decoding, said combining comprising assembling the at least one same respective image portion of said subdivision grid of each video stream thereby obtaining said region of interest.

For example, said at least one encoded video stream is encoded from a common subdivided video stream, the method further comprising:
receiving said common subdivided video stream encoded with a low resolution,
decoding said encoded common subdivided video stream, and
generating said video signal based at least on said decoded common subdivided video stream.

For example, each one of the plurality of encoded video streams is encoded with a base layer with a low resolution and an enhancement layer with said images with at least one same respective image portion of the subdivision grid encoded with a higher resolution than the other image portions of the subdivision grid, and wherein said decoding is performed based at least on said base layer and enhancement layer.

For example, said base layer is the same for the plurality of encoded video streams.

A fourth aspect of the invention relates to a device for implementing a method according to the first aspect, such device may comprise means for implementing the steps of the method, such as a processing unit configured for executing said steps.

A fifth aspect of the invention relates to a device for implementing a method according to the second aspect. Such device may comprise means for implementing the steps of the method, such as a processing unit configured for executing said steps.

A sixth aspect of the invention relates to a device for implementing a method according to the third aspect. Such device may comprise means for implementing the steps of the method, such as a processing unit configured for executing said steps.

A seventh aspect of the invention relates to systems comprising at least one device according to the fourth, fifth and sixth aspects of the invention.

An eighth aspect of the invention relates to computer programs and computer program products comprising instructions for implementing methods according to the first, second and/or third aspect(s) of the invention, when loaded and executed on computer means of a programmable apparatus such as an encoding device, a server device and/or a client device.

According to an embodiment, information storage means readable by a computer or a microprocessor store instructions of a computer program, that it makes it possible to implement a method according the first, second and/or third aspect of the invention.

The objects according to the second, third, fourth, fifth, sixth, seventh, and eighth aspects of the invention provide at least the same advantages as those provided by the method according the first aspect of the invention.

Figure 3B:
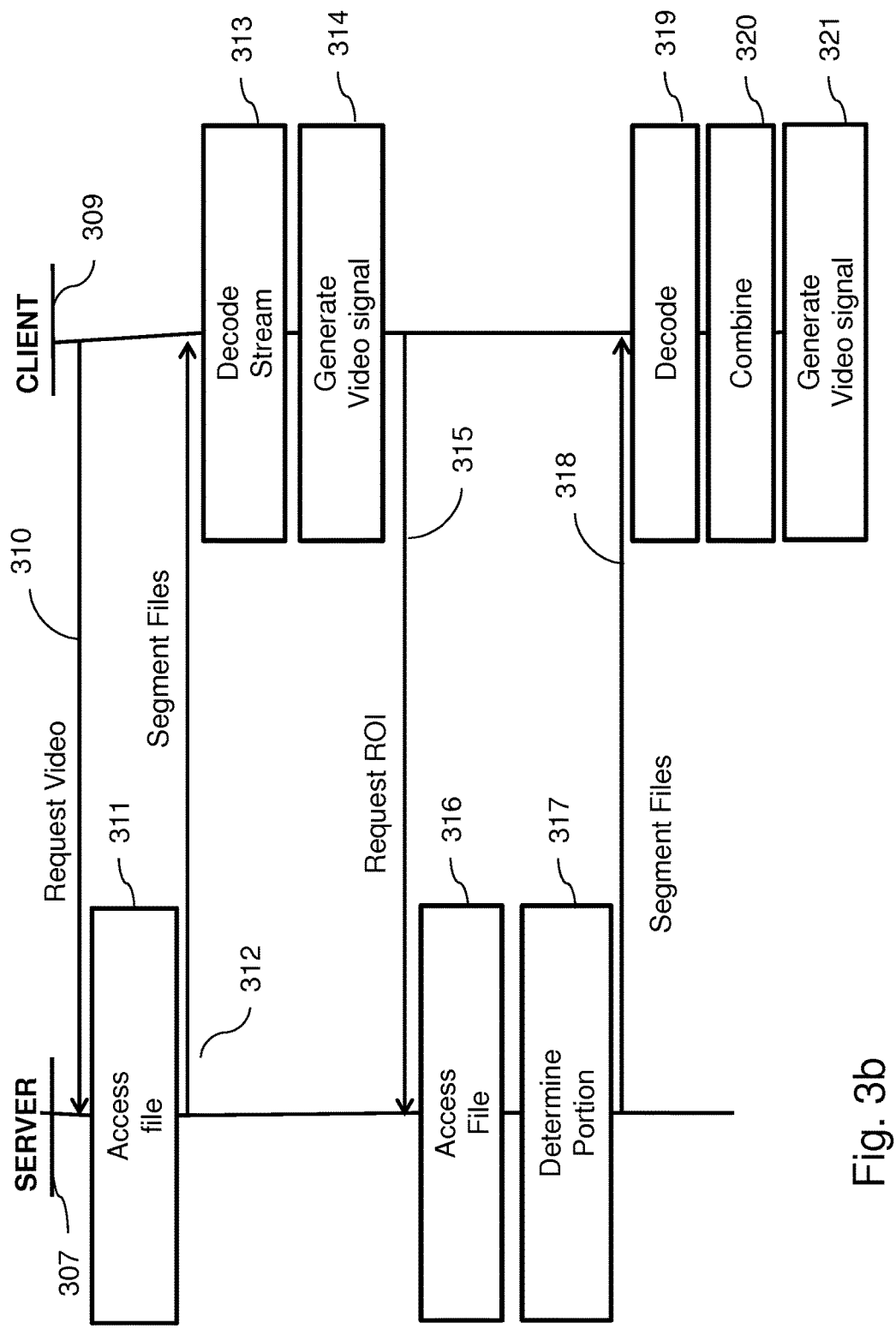
Figure 4B:
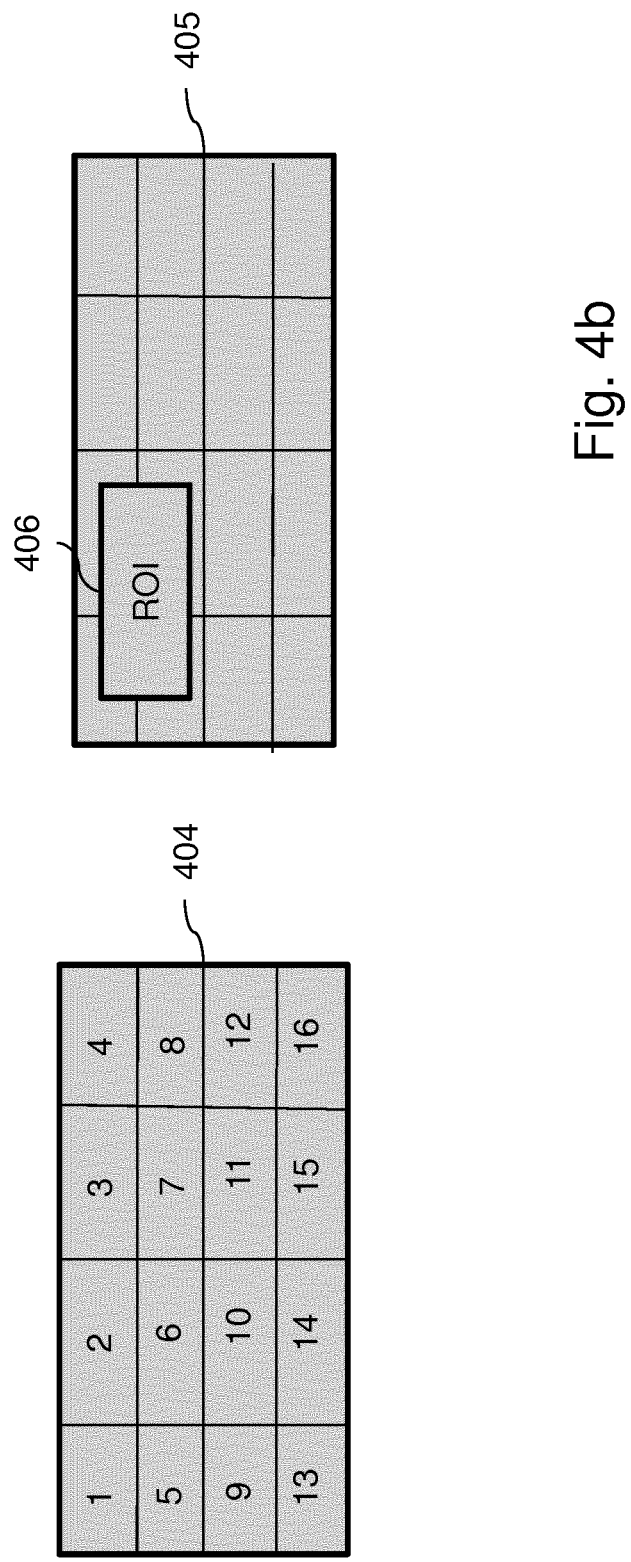
Figure 5A:
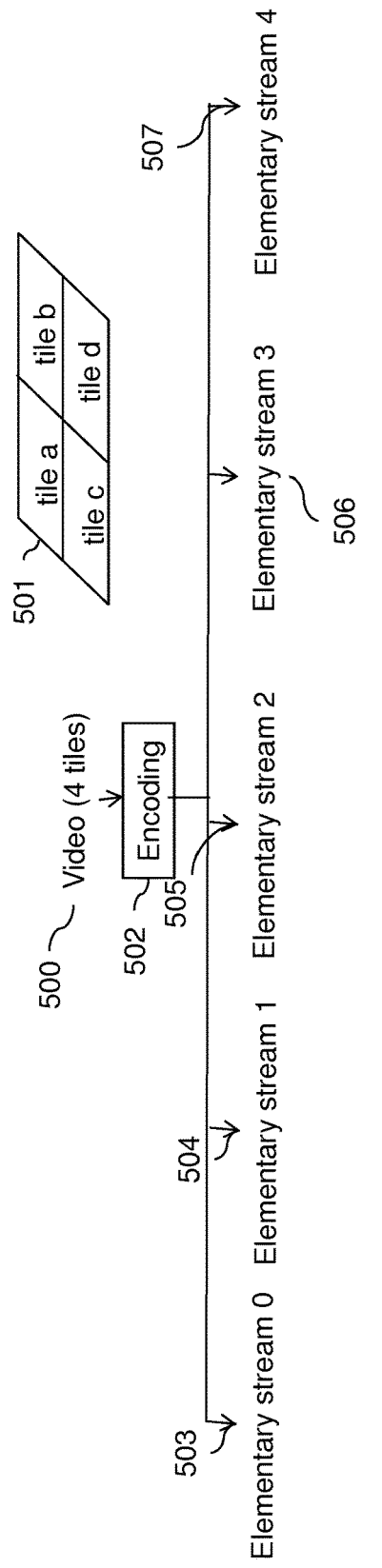
Figure 5B:
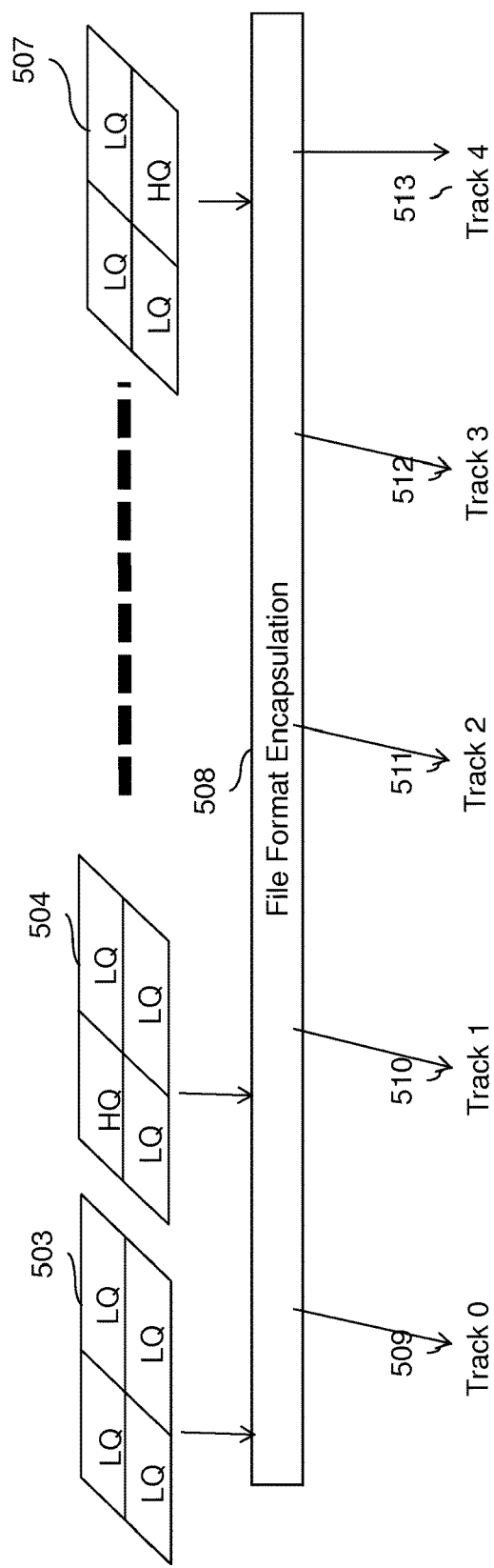
Figure 6A:
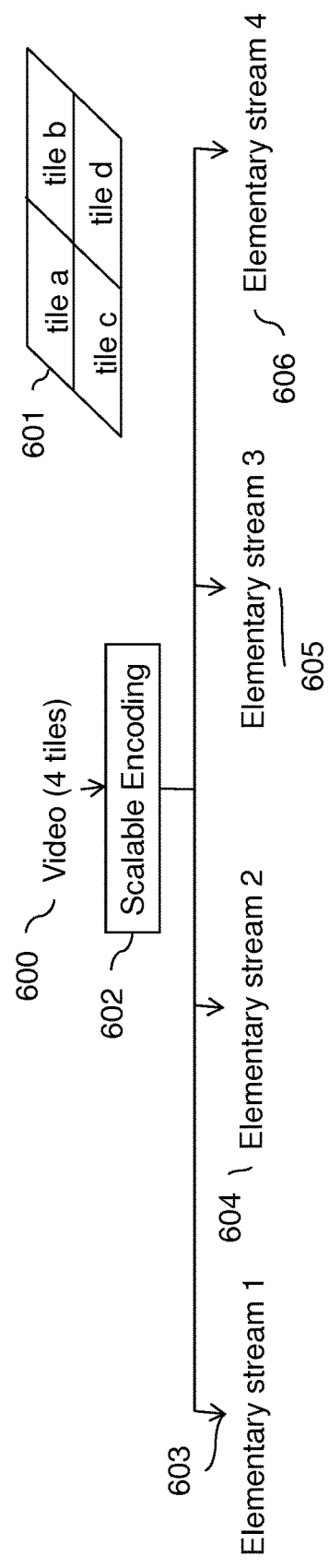
Figure 6B:
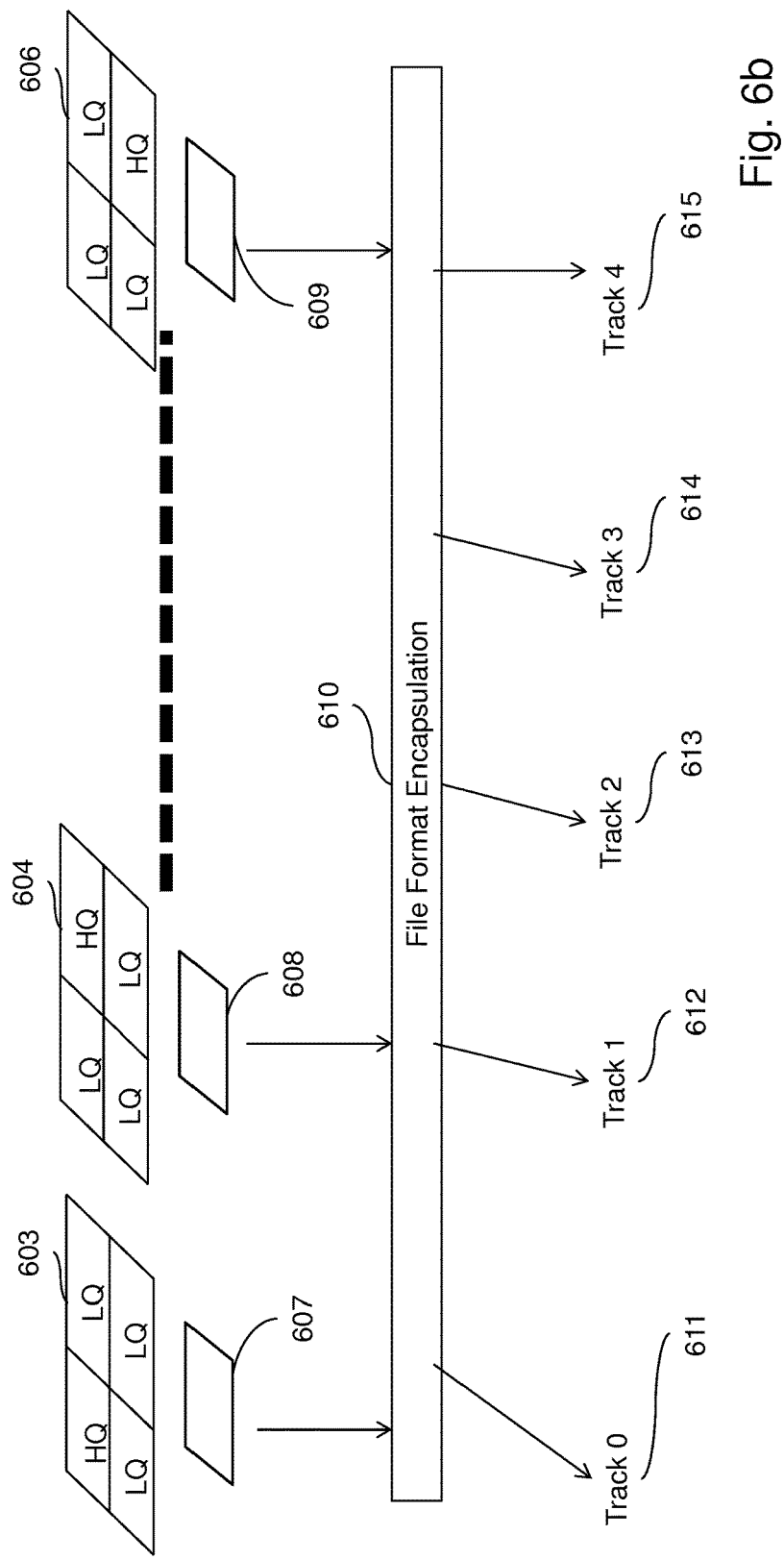
Figure 6C:
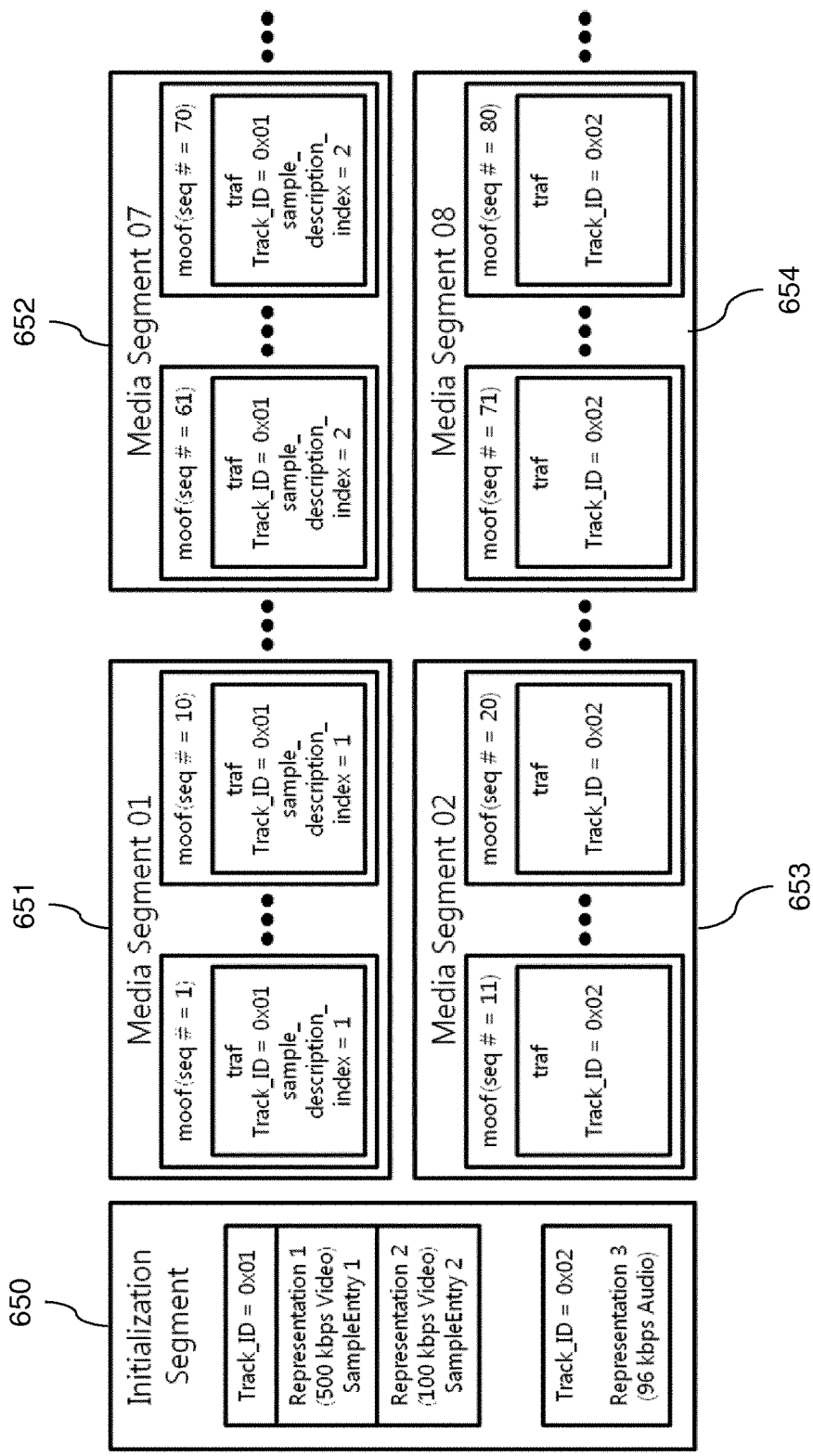
Figure 9:
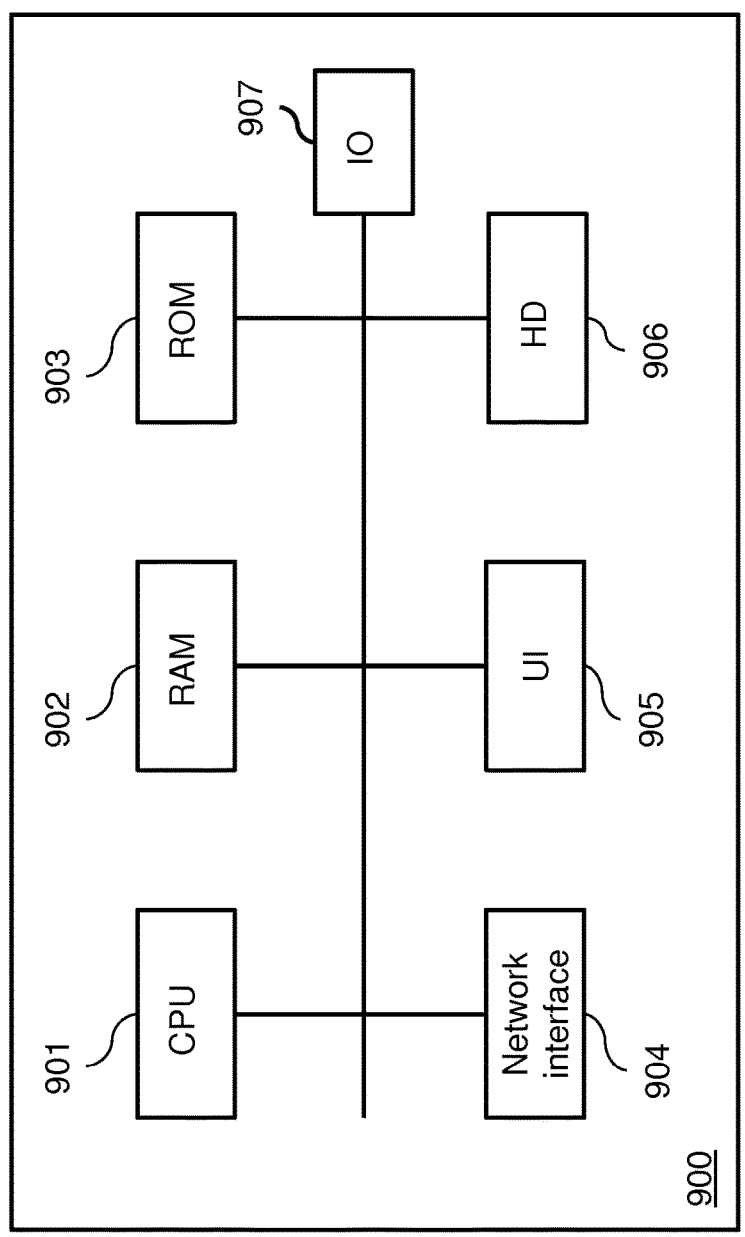

Other features and advantages of the invention will become apparent from the following description of non-limiting exemplary embodiments, with reference to the appended annexes and drawings, in which, in addition to FIGS. 1 and 2:

FIGS. 3*a* and 3*b* are a schematic illustration of a general context of implementation of embodiments, FIGS. 4*a* and 4*b* are schematic illustrations of encoding and displaying according to embodiment, FIGS. 5*a* and 5*b* are schematic illustrations of encapsulation with a non-scalable codec according to embodiments, FIGS. 6*a* and 6*b* are schematic illustrations of encapsulation with a scalable codec according to embodiments, FIG. 6*c* is a schematic illustration of segment files, FIGS. 7 and 8 are illustrations of the use of a file format according to embodiments FIG. 9 is a schematic illustration of a device according to embodiments, and Annexes A, B and C illustrate file formats according to embodiments.

In what follows, a general context of implementation of embodiments of the invention is first presented. Next, more specific details of implementation are described.

FIG. 3*a* is an illustration of the generation of an encapsulation file according to embodiments.

A source device 300 generates a video stream 301. The source device may be a video camera, a playback device or another kind of video source device. The video stream is received by an encoding device 302.

The encoding device subdivides the video stream received, according to a subdivision grid, during a step 303. Each image (or frame) of the video stream received is subdivided according to said same subdivision grid into image potions. Alternatively, the encoding device may receive a video stream already subdivided.

Next, during a step 304, a plurality of video streams are encoded, based on the subdivided video stream. In each encoded video stream, at least one image portion of the grid is encoded with a higher quality than the other image portions. In each frame of the same encoded video stream, the same image portion is encoded with higher quality.

Once the video stream received is encoded as a plurality of encoded video streams, the encoded video streams are encapsulated into an encapsulation file 305 during a step 306.

The encapsulation file is subsequently transmitted to a server device 307, in order to be stored during a step 308.

One or several devices presented with reference to FIG. 3*a* may belong to a same device or system.

FIG. 3*b* is an illustration of the use of the encapsulation file according to embodiments.

A client device 309, such as a display device, sends a video request 310 to the server device. The video request relates to the video stream 301 encoded by the encoding device 302.

The server device identifies the video stream and accesses the corresponding encapsulation file 305 during a step 311. The server device then starts streaming of the video by transmitting to the client device segment files 312.

Based on the segment files received from the server device, the client device decodes the video stream during step 313. A video signal is generated, during step 314, based on the decoding step, in order to display the video stream on a screen.

During display of the video stream, appears the need for having a region of interest in the video stream displayed with higher quality. For example, a user identifies such region of interest and requests display with high quality.

A request 315 is transmitted from the client device to the server device. The request comprises an identification of the region of interest.

Upon receipt of the request, the server device identifies the region of interest and, during a step 316, it accesses the encapsulation file in order to determine, during a step 317, image portions of the grid that correspond to the region of interest.

The encoded video streams corresponding to the image portions determined are then transmitted to the client device through segment files 318.

Upon receipt of the segment files, the client device extracts the encoded video streams from segment files and decodes them during a step 319 and combines the video streams during a step 320 in order to generate a video signal (step 321), wherein the region of interest is defined with higher quality than the other parts of the images. The client device uses the video signal generated for displaying the video stream according to the request, i.e. with the region of interest displayed with high quality, Encoding according to embodiments is described with reference to FIG. 4*a*. An initial video stream 400 is encoded and encapsulated in order to make it possible for the user to select a region of interest (ROI) in the video stream and have the ROI displayed with a higher quality than the remainder of the video stream.

Each image (or "frame" hereinafter) of the video stream 400 is subdivided into image portions (or "tiles" hereinafter) 401. For example, in FIG. 4*a*, each image is subdivided according to a rectangular grid of 2 by 4 squares. The grid has four upper tiles T1, T2, T3, T4 and four lower tiles T5, T6, T7, T8. The grid is common to the frames of the video stream. However, the embodiments of the invention are not limited to the grid presented in FIG. 4*a*. Other designs of the grid may be envisaged.

Once the initial video stream is subdivided according to the grid, a plurality of encoded video streams 402, 403 are generated. Each encoded video stream generated has in each frame an image portion encoded with a higher quality than the other image portions. For example, in encoded video stream 402, the frames have tile T1 encoded with a higher quality than the other tiles T2-T8. In encoded video stream 403, the frames have tile T8 encoded with a higher quality than the other tiles T1-T7. A plurality of encoded video streams is obtained wherein each tile T1-T8 is encoded with high quality in at least one encoded video stream. Although this is not represented in FIG. 4*a*, one, two or more tiles may be encoded with high quality in a same encoded video stream.

The encoded video streams are thereafter encapsulated into an encapsulation file. The encapsulation file may be a media presentation having as many video tracks as encoded video streams.

Display and streaming according to embodiments is described with reference to FIG. 4*b*. In the example illustrated in FIG. 4*b*, the initial video stream 400 has been subdivided into 16 tiles (numbered 1 to 16), according to a rectangular grid 404 of 4 by 4 rectangles.

An ROI 406 is defined, for example by a user, in order to have it displayed with a higher quality than the remainder of the video streams. In the example of FIG. 4*b*, the ROI extends over four tiles (1, 2, 5 and 6). Thus, four encoded video streams are selected wherein the tiles (1, 2, 5 and 6) are (respectively) encoded with high quality.

The selected encoded video streams are then decoded and combined to display frames wherein the ROI has a higher resolution than the remainder of the frame.

In what follows, encapsulation is described with more details with reference to FIG. 5*a* and FIG. 5*b*. An initial non-scalable video stream 500 is considered. The initial video stream is subdivided into four tiles "a", "b", "c" and "d", according to a 2 by 2 rectangles grid 501.

During encoding 502, five encoded video streams ("elementary streams" hereinafter) 503, 504, 505, 506 and 507 are generated from the initial video stream. Each tile of the grid has been encoded with a higher quality in a respective encoded video stream. Since the grid has four tiles and five elementary streams are generated, one of the elementary streams (503) is wholly encoded with low quality.

Elementary streams are illustrated in more details in FIG. 5*b*. All tiles "a", "b", "c" and "d" in elementary stream 503 are encoded with basic or low quality (LQ). In elementary stream 504, tile "a" is encoded with high quality (HD), whereas the other tiles have been encoded with low quality. In elementary stream 505 (not represented), tile "b" is encoded with high quality (HD), whereas the other tiles have been encoded with low quality. In elementary stream 506 (not represented), tile "c" is encoded with high quality (HD), whereas the other tiles have been encoded with low quality. In elementary stream 507, tile "d" is encoded with high quality (HD), whereas the other tiles have been encoded with low quality.

Once all the elementary streams are generated, they are encapsulated into an encapsulation file 508 ("encapsulation format" hereinafter). ISO Base Media File Format and its extensions may be used. However, other formats may be used.

The encapsulation file comprises several video tracks respectively corresponding to the generated elementary streams. The file is a media presentation. Video tracks 509 ("Track 0"), 510 ("Track 1"), 511 ("Track 2"), 512 ("Track 3"), 512 ("Track 4") respectively correspond to encapsulated elementary streams 503, 504, 505, 506, 507.

The ISO BMFF and the extension for DASH make it possible to put each track in different segment files. In such case, an initialization segment is generated. DASH is defined in documents "*ISO/IEC 23009-1, Dynamic adaptive streaming over HTTP (DASH), Part1: Media presentation description and segment formats*", "*ISO/IEC 14496-12, Information technology—Coding of audio-visual objects—Part 12: ISO base media file format*" and "*ISO/IEC 14496-12:2008/FPDAM 3 & ISO/IEC 14496-12:2008/DAM 3—Coding of audio-visual objects—Part 12: ISO base media file format, AMENDEMENT 3: DASH support and RTP*").

The initialization segment contains data defining and initializing the tracks. The initialization segment is associated with segment files. Each video track may be put in a respective segment file. Therefore, each track may be streamed independently. Based on these segment files, only the video tracks (and thus the segment files) useful for the end user can be sent.

Encapsulation is described with reference to FIG. 6*a* and FIG. 6*b*, with an initial video stream 600. The encapsulation is similar to the encapsulation described with reference to FIGS. 5*a* and 5*b*, but the video codec used is a scalable video codec. For example, the SVC video codec may be used.

The initial video stream is subdivided into four tiles "a", "b", "c" and "d", according to a 2 by 2 rectangles grid 601.

During encoding 602, four encoded video streams ("elementary streams" hereinafter) 603, 604, 605, and 606 are generated from the initial video stream. Each tile of the grid has been encoded with a higher quality in a respective encoded video stream. Since a scalable video codec is used, each elementary stream contains NAL units (acronym for Network Abstraction Layer) corresponding to the base layer and NAL units corresponding to the enhancement layer.

Elementary streams are illustrated in more details in FIG. 6*b*. The enhancement layers of the elementary streams differ from one another because each one contains a different respective tile encoded with high quality tile. In elementary stream 603, tile "a" is encoded with high quality (HD), whereas the other tiles have been encoded with low quality. In elementary stream 604, tile "b" is encoded with high quality (HD), whereas the other tiles have been encoded with low quality. In elementary stream 605 (not represented), tile "c" is encoded with high quality (HD), whereas the other tiles have been encoded with low quality. In elementary stream 606, tile "d" is encoded with high quality (HD), whereas the other tiles have been encoded with low quality.

The elementary streams 603, 604, 606 comprise respective base layers 607, 608, 609. Elementary stream 605 (not represented) also comprises a base layer. The base layers are the same for all the elementary streams.

Once the elementary streams have been generated, they are encapsulated into an encapsulation file 610 ("file format"

hereinafter). The ISO Base Media File Format and its extensions may be used. However, other formats may be used.

The encapsulation file comprises several video tracks respectively corresponding to the generated elementary streams. The encapsulation file also comprises a video track corresponding to the base layer. Since all the elementary streams share the same base layer, it is possible to create a video track containing the NAL units of the base layer. The file is a media presentation. Video tracks 611 ("Track 0") correspond to the base layer and video tracks 612 ("Track 1"), 613 ("Track 2"), 614 ("Track 3"), 615 ("Track 4") respectively correspond to encapsulated elementary streams 603, 604, 605, 606. In order to reduce redundancy, extractors (NALU) may be used. Extractors are specific NAL units that make it possible to point to other NALU in other external tracks. Thus, the video tracks (612, 613, 614 and 615) may be video tracks containing extractors pointing to track 611. The extractors are replaced during de-encapsulation by the NAL units of the base layer.

The ISO BMFF and the extension for DASH make it possible to put each track in different segment files. In such case, an initialization segment is generated. The initialization segment contains data defining and initializing the tracks. The initialization segment is associated with segment files. Each video track may be put in a respective segment file. Therefore, each track may be streamed independently. Based on these segment files, only the video tracks (and thus the segment files) useful for the end user can be sent.

The segment files (or media segments) are described with reference to FIG. 6c. The ISO BMFF and the extensions for DASH make it possible to split a media presentation into autonomous fragments. Each fragment corresponds to a respective period of time. A fragment comprises at least a "movie fragment box" (moof) and a "media data box" (not represented in the figure). The media data box contains the elementary stream corresponding to the period of time of the fragment. The movie fragment box contains the metadata data corresponding to the elementary stream. Fragments corresponding to a same track can be grouped together in a same media segment (or segment file). This is illustrated in FIG. 6c. Two tracks are defined. The first track is a video track with the "track_ID" data equal to 0x01 (with two representations), the second track is an audio track with "track_ID" equal to 0x02.

The two tracks are initially defined in an initialization segment 650. For example, the initialization segment contains a definition of each track (track box, track header box etc.) and the composition information of the different tracks (still in the track boxes). A set of segment files 651, 652, 653 and 654 can be defined. Media segment 651 contains fragments corresponding to the first track. Media segment 652 contains fragments related to the same first track. These fragments correspond to a different period of time. Media segment 653 contains fragments related to the second track. Media segment 654 contains fragments related to the same second track. Fragment 653 corresponds to a period of time different from the one associated with fragment 654. These media segments can be streamed separately and concatenated together with an initialization segment. The resulting media presentation is compatible with the ISO BMFF file format standard.

When using the ISO BMFF reference file format, modifications of the file format may be envisaged. Modifications are presented with reference to Annex A, Annex B and Annex C.

Annex A is the code for the track header box ('tkhd') in the current version of the file format defined in document "ISO/IEC 14496-12, Information technology—Coding of audio-visual objects—Part 12: ISO base media file format". The file format is an encapsulation format that describes the elementary streams of the tracks comprised in a media presentation. The file format has tools for composing the tracks. The track box contains several other boxes. One of the boxes is the track header box ('tkhd'). The "layer" attribute specifies the front-to-back ordering of the video tracks. Tracks with lower numbers are displayed in front. "0" is the default value, and "−1" correspond to images in front, and so on.

The "width" and "height" attributes specify the track's visual presentation size as fixed-point 16.16 values. These values need not to be the same as the pixel dimensions of the images, which is documented in the sample description(s). All images in the sequence are scaled to this size, before any overall transformation of the track represented by the matrix. The pixel dimensions of the images are the default values.

Annex B shows the attributes that may be added into the track header box. Embodiments of the invention are not limited to names indicated in Annex B. Any other names could be used. The attributes make it possible to define spatial sub-parts of frames of video tracks as layers, once the decoding of the frame is performed. Thus, it may be possible to combine together spatial sub-parts of each frame of decoded video tracks. Since the attributes added are located in the track header box, they will be applied for each decoded frame of the corresponding video track.

The attribute "nb_tiles" specifies the number of spatial sub-parts that are defined in the track. For each sub-parts, the following attributes may be applied:

"(horizontal_origin, vertical_origin)" specifies the track's visual presentation origin of the current spatial sub-part (left and up corner of the rectangular track). The units of these two parameters are the same as the one used for the (height, width) attributes of the track header.

"width" and "height" specify the rectangular spatial sub-part visual presentation size as fixed-point 16.16 values. The units of these two parameters are the same as the one used for the (height, width) attributes of the track header.

"tile_layer" specifies the front-to-back ordering of the current spatial sub-part. Video sub-parts with lower numbers are displayed in front. "0" is the default value, and "−1" correspond to images in front, and so on.

If the proposed new attributes are not used, the default 'layer' value indicated in the track header is used for each frame of the video.

Annex C illustrates embodiments wherein the tile and layering information are not located in one given box of the file format, as in Annex B wherein the information is put in the track header box, but rather spread over several boxes.

For example, in code C1, the movie header box ('mvhd') and the track header box ('tkhd') are modified compared to the 'mvhd' and 'tkhd' boxes in document "ISO/IEC 14496-12, Information technology—Coding of audio-visual objects—Part 12: ISO base media file format".

In the movie header box of code C2, the tile information is introduced from two parameters: "tile_width" and "tile_height". These two parameters define the horizontal and vertical sizes of a tile. These parameters are used for all the video tracks existing in the movie presentation. For example, with reference to the FIG. 4a, the parameters (tile_width, tile_height) are used for indicating that the video is partitioned into non-overlapping tiles and that the size of each tile is given by (tile_width, tile_height). Once the tiles are defined, they are indexed from the left up to right bottom (1 to 8 in FIG. 4*a*). If the parameters (tile_width, tile_height) are set to "0", it is interpreted as no tile is defined.

In the track header box of Code C1, new attributes for the track header box are presented:

"nb_tiles": specifies the number of spatial sub-parts defined in the track. The value of this parameter is the same as the number of tiles defined by the (tile_width, tile_height) attributes of the movie header box.

Each sub-part has the following attributes:

"Tile_reference": is an index pointing to one of the tiles defined by the (tile_width, tile_height) attributes of the movie header box.

"tile_layer": specifies the front-to-back ordering of the spatial sub-part (spatial sub-parts with lower numbers are on top of the superimposed layers: "0" is the default value, "−1" is the value of the attribute of sub-parts in front of tracks having the attribute set to "0", and so on.

With reference to FIG. 7, definition of the values of the attributes according to embodiments is described. FIG. 7 more particularly focuses on the server side.

An exemplary initial video is subdivided into 4 tiles ("a", "b", "c" and "d"). Four elementary streams (700, 701, 702 and 703) are generated. For example, a scalable codec is used. The enhancement layers of the elementary streams differ from one another because each one contains a different respective tile encoded with high quality tile. In elementary stream 700, tile "a" is encoded with high quality (HD), whereas the other tiles have been encoded with low quality. In elementary stream 701, tile "b" is encoded with high quality (HD), whereas the other tiles have been encoded with low quality. In elementary stream 702 (not represented), tile "c" is encoded with high quality (HD), whereas the other tiles have been encoded with low quality. In elementary stream 703, tile "d" is encoded with high quality (HD), whereas the other tiles have been encoded with low quality.

The elementary streams 700, 701, 702, 703 each comprise respective base layers. The base layers are the same for all the elementary streams.

Once the elementary streams have been generated, they are encapsulated into an encapsulation file 704 (or "file format"). The ISO Base Media File Format and its extensions may be used. However, other formats may be used.

The encapsulation file comprises several video tracks respectively corresponding to the generated elementary streams. Video track 705 ("Track 0") corresponds to the base layer and video tracks 706 ("Track 1"), 707 ("Track 2"), 708 ("Track 3"), 709 ("Track 4") respectively correspond to encapsulated elementary streams 700, 701, 702, 703.

During encapsulation, the boxes presented hereinabove, with reference to Annexes A, B and C are filled in. Since Track 0 corresponds to the base layer, there is no high quality spatial sub-part defined. The high quality sub-parts are however defined for the other tracks. For the sake of conciseness, the values given to the attributes are shown on FIG. 7 only for Track 1 and Track 2.

Concerning Track 1:
the default layer value for the whole video (e.g. for each frame of the video) is "0",
"Nb_tiles" is set to "1" because the video track has one tile defined with high quality (tile a)
the location of this high quality tile is defined by:
its origin (0,0)
its size (100,100)
"Tile_Layer" is set to "−1", which means that the high quality layer should be placed on top of the superimposed video tracks during combination for display.

Concerning Track 2:
the default layer value for the whole video (e.g. for each frame of the video) is "0",
"Nb_tiles" is set to "1" because the video track has one tile defined with high quality (tile b),
the location of the high quality tile is defined by:
its origin (100,0)
its size (100,100)
"Tile_Layer" is set to "−1", which means that the high quality layer should be placed on top of the superimposed video tracks during combination for display.

The video tracks are the video tracks of a same media presentation. They can be included in a same global file or they can be split into independent segment files. In the case of independent segment files, an initialization segment is generated. This initialization segment contains the track header boxes.

With reference to FIG. 8, the use of the values of the attributes according to embodiments is described. FIG. 8 more particularly focuses on the client side.

In the example shown in FIG. 8, it is supposed that an ROI, (which may be selected by a user) is included in tile 'a' and tile 'c' of the initial video stream of FIG. 7. In order to display the ROI with high quality, three video tracks are sent from the server to the client:

Track 0 (705) which contains the base layer,
Track 1 (706) which contains high quality tile a,
Track 3 (708) which contains high quality tile c.

Tracks 1 and 3 both use Track 0 through extractors, which make it possible to save bandwidth and memory space.

Independent streaming of each video track is made possible by definition of segment files (one initialization segment introduces the different video tracks and segment files containing the encapsulated elementary streams).

Once the three tracks are received, elementary streams contained in Tracks 1 and 3 are extracted (step 803), using extractors pointing to Track 0. 'stbl' boxes within the track boxes (or 'trun' boxes) store composition or decoding times used for extracting Tracks 1 and 3.

After elementary stream extraction (frame by frame), the elementary stream is decoded (step 804). Decoded frames 807 and 808, respectively belonging to Track 1 and Track 3 are shown in FIG. 8.

Once the frames are decoded, they are combined together based on the layering information ("Tile_Layer" attribute). The track header layering is read during step 805. For example, reading of the layering can be done once and for all as soon as the video tracks are received (for example when the initialization file is received).

The layering 810 of Track 1 has the layer value set to "−1" for tile "a", and the layer value set to "0" for the other tiles. The layering 809 of Track 3 has the layer value set to "−1" for tile "c", and the layer value set to "0" for the other tiles. Based on these layering maps, the pixels of frames 807, 808 are combined into a frame 811.

Since tile <<a>> has the "Tile_Layer" attribute set to "−1" in frame 810 and set to "0" in frame 809, tile <<a>> from frame 810 is shown in front. Since tile <<c>> has the "Tile_Layer" attribute set to "−1" in frame 809 and set to "0" in frame 810, tile <<c>> from frame 809 is shown in front. Therefore, Frame 811 has pixels in tiles "a" and "c" coming from a video stream encoded with high quality.

The ROI being included in tiles "a" and "c", it can be displayed with high quality.

FIG. 9 is a schematic block diagram of a computing device 900 for implementation of one or more embodiments of the invention. The computing device 900 may be a device such as a micro-computer, a workstation or a portable device. The computing device 900 comprises a communication bus connected to:
- a central processing unit 901 (CPU), such as a microprocessor;
- a random access memory 902 (RAM), for storing the executable code of methods according to embodiments of the invention and/or register for variables and parameters used for implementation of the methods;
- a read only memory 903 (ROM), for storing computer programs for implementing embodiments of the invention;
- a network interface 904 connected to a communication network over which digital data to be processed are transmitted or received. The network interface 904 can be a single network interface, or composed of a set of different network interfaces (for instance wired and/or wireless interfaces. Data transmission may be controlled by a software application executed by the CPU;
- a user interface 905 for receiving inputs from a user or to display information to a user;
- a hard disk 906 (HD);
- an I/O module 907 for receiving/sending data from/to external devices such as a video source or display.

The executable code may be stored either in read only memory 903, on the hard disk 906 or on a removable digital medium such as disk. The executable code of the programs may also be received by means of a communication network, via the network interface 904, in order to be stored in one of the storage means of the communication device 900, such as the hard disk 906, before being executed.

The central processing unit 901 is configured for controlling execution of the instructions or portions of software code of the program or programs according to embodiments of the invention, which instructions are stored in one of the aforementioned storage means. The CPU 901 may execute instructions from the RAM memory after the instructions have been loaded from the ROM memory or the hard-disc (HD) for example. Such software application, when executed by the CPU 901, causes the steps of methods according to embodiments.

A computer program according to embodiments may be designed based on the flowcharts of FIGS. 3a, 3b, Annexes A, B, C and the present description.

Such computer program may be stored in a ROM memory of a system or device as described with reference to FIG. 9. It may be loaded into and executed by a processor of such device for implementing steps of a method according to the invention.

Embodiments of the inventions may also be implemented in hardware (for example, in the form of an Application Specific Integrated Circuit or ASIC).

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

ANNEX A

```
aligned(8) class TrackHeaderBox extends FullBox('tkhd', version, flags){
    if (version==1) {
        unsigned int(64) creation_time;
        unsigned int(64) modification_time;
        unsigned int(32) track_ID;
        const unsigned int(32) reserved = 0;
        unsigned int(64) duration;
    } else { // version==0
        unsigned int(32) creation_time;
        unsigned int(32) modification_time;
        unsigned int(32) track_ID;
        const unsigned int(32) reserved = 0;
        unsigned int(32) duration;
    }
    const unsigned int(32)[2] reserved = 0;
    template int(16) layer = 0;
    template int(16) alternate_group = 0;
    template int(16) volume = {if track_is_audio 0x0100 else 0};
    const unsigned int(16) reserved = 0;
    template int(32)[9] matrix= {
    0x00010000,0,0,0,0x00010000,0,0,0,0x40000000 }; // unity matrix
    unsigned int(32) width;
    unsigned int(32) height;
}
```

ANNEX B

```
aligned(8) class TrackHeaderBox extends FullBox('tkhd', version, flags){
if (version==1) {
        unsigned int(64) creation_time;
        unsigned int(64) modification_time;
        unsigned int(32) track_ID;
        const unsigned int(32) reserved = 0;
        unsigned int(64) duration;
} else { // version==0
        unsigned int(32) creation_time;
        unsigned int(32) modification_time;
        unsigned int(32) track_ID;
        const unsigned int(32) reserved = 0;
        unsigned int(32) duration;
}
const unsigned int(32)[2] reserved = 0;
template int(16) layer = 0;
template int(16) alternate_group = 0;
template int(16) volume = {if track_is_audio 0x0100 else 0};
const unsigned int(16) reserved = 0;
template int(32)[9] matrix=
{ 0x00010000,0,0,0,0x00010000,0,0,0,0x40000000 };
// unity matrix
unsigned int(32) width;
unsigned int(32) height;
unsigned int nb_tiles;
for (unsigned int i= 1 to nb_tiles;i++){
        unsigned int(32) horizontal_origin;
        unsigned int(32) vertical_origin;
        unsigned int(32) width;
        unsigned int(32) height;
        template int(16) tile_layer = 0;
    }
}
```

ANNEX C

```
Code C1
aligned(8) class TrackHeaderBox
extends FullBox('tkhd', version, flags){
```

-continued

ANNEX C

```
if (version==1) {
    unsigned int(64) creation_time;
    unsigned int(64) modification_time;
    unsigned int(32) track_ID;
    const unsigned int(32) reserved = 0;
    unsigned int(64) duration;
} else { // version==0
    unsigned int(32) creation_time;
    unsigned int(32) modification_time;
    unsigned int(32) track_ID;
    const unsigned int(32) reserved = 0;
    unsigned int(32) duration;
}
const unsigned int(32)[2] reserved = 0;
template int(16) layer = 0;
template int(16) alternate_group = 0;
template int(16) volume = {if track_is_audio 0x0100 else 0};
const unsigned int(16) reserved = 0;
template int(32)[9] matrix=
{ 0x00010000,0,0,0,0x00010000,0,0,0,0x40000000 };
// unity matrix
unsigned int(32) width;
unsigned int(32) height;
unsigned int nb_tiles;
for (unsigned int i=1 to nb_tiles;i++){
    unsigned int tile_reference;
    template int(16) tile_layer;
    }
}
Code C2
aligned(8) class MovieHeaderBox extends FullBox('mvhd', version, 0) {
if (version==1) {
unsigned int(64) creation_time;
unsigned int(64) modification_time;
unsigned int(32) timescale;
unsigned int(64) duration;
} else { // version==0
unsigned int(32) creation_time;
unsigned int(32) modification_time;
unsigned int(32) timescale;
unsigned int(32) duration;
}
template int(32) rate = 0x00010000; // typically 1.0
template int(16) volume = 0x0100; // typically, full volume
const bit(16) reserved = 0;
const unsigned int(32)[2] reserved = 0;
template int(32)[9] matrix =
{ 0x00010000,0,0,0,0x00010000,0,0,0,0x40000000 };
// Unity matrix
bit(32)[6] pre_defined = 0;
unsigned int(32) next_track_ID;
unsigned int tile_width;
unsigned int tile_height;
}
```

The invention claimed is:

1. A method of processing a video stream for encapsulation into an encapsulation file comprising media data and metadata describing the media data, the method comprising the following steps:
obtaining the video stream, wherein each image of the video stream is subdivided into a plurality of image portions according to a subdivision grid,
encoding the images of the video stream into each of a plurality of encoded video streams, wherein, for each of the encoded video streams, at least one same image portion of the image portions of the images of the video stream is encoded with a higher resolution than the other image portions, and
encapsulating the plurality of encoded video streams into the encapsulation file,
wherein the encapsulation file is used in order to determine image portions that correspond to a region of interest,
wherein each image portion of the encapsulated encoded video streams being associated with resolution level data representing a level of resolution with which said each image portion is encoded and said resolution level data comprises superimposition data indicating a position of a data portion in a superimposition of image layers, and
wherein each image portion of the encapsulated encoded video stream is associated with location information indicating a position of the image portion in the subdivision grid.

2. The method according to claim 1, wherein said location information comprises:
coordinates of a starting point of the at least one same respective image portion, and
dimension information representing a dimension of said at least one same respective image portion.

3. The method according to claim 1, further comprising encapsulating, into said encapsulation file, said video stream encoded with a low resolution.

4. The method according to claim 1, wherein each one of the plurality of encoded video streams is encoded with a base layer with a low resolution and an enhancement layer with said images with at least one same respective image portion of the subdivision grid encoded with a higher resolution than the other image portions of the subdivision grid.

5. The method according to claim 4, wherein said base layer is the same for the plurality of encoded video streams.

6. An image processing device for processing a video stream for encapsulation into an encapsulation file comprising media data and metadata describing the media data, the device comprising a processing unit configured for:
obtaining the video stream, wherein each image of the video stream is subdivided into a plurality of image portions, and wherein the images of the video stream are subdivided according to a subdivision grid,
encoding the images of the video stream into each of a plurality of encoded video streams, wherein, for each of the encoded video streams, at least one same image portion of the image portions of the images of the video stream is encoded with a higher resolution than the other image portions, and
encapsulating the plurality of encoded video streams into an encapsulation file,
wherein the encapsulation file is used in order to determine image portions that correspond to a region of interest,
wherein each image portion of the encapsulated encoded video streams being associated with resolution level data representing a level of resolution with which said each image portion is encoded and wherein said resolution level data comprises superimposition data indicating a position of a data portion in a superimposition of image layers, and
wherein each image portion of the encapsulated encoded video stream is associated with location information indicating a position of the image portion in the subdivision grid.

7. The device according to claim 6, wherein said location information comprises:
coordinates of a starting point of the at least one same respective image portion, and
dimension information representing a dimension of said at least one same respective image portion.

8. The device according to claim 6, the processing unit being further configured for encapsulating, into said encapsulation file, said video stream encoded with a low resolution.

9. The device according to claim 6, wherein each one of the plurality of encoded video streams is encoded with a base layer with a low resolution and an enhancement layer with said images with at least one same respective image portion of the subdivision grid encoded with a higher resolution than the other image portions of the subdivision grid.

10. The device according to claim 9, wherein said base layer is the same for the plurality of encoded video streams.

11. An image processing system comprising:
a first image processing device for processing a video stream for encapsulation into an encapsulation file comprising media data and metadata describing the media data, the first image processing device comprising a processing unit configured for:
obtaining the video stream, wherein each image of the video stream is subdivided into a plurality of image portions, and wherein the images of the video stream are subdivided according to a subdivision grid,
encoding the images of the video stream into each of a plurality of encoded video streams, wherein, for each of the encoded video streams, at least one same image portion of the image portions of the images of the video stream is encoded with a higher resolution than the other image portions, and
encapsulating the plurality of encoded video streams into an encapsulation file,
wherein the encapsulation file is used in order to determine image portions that correspond to a region of interest,
the system further comprising:
a second image processing device for processing said encapsulation file for streaming video data, the second image processing device comprising a processing unit configured for:
obtaining a request for enhanced displaying of the region of interest in images of a video stream with a higher resolution than the remainder of said images,
accessing said encapsulation file comprising encapsulated encoded video streams, encoded from a common video stream, wherein each image of each encoded video stream is subdivided into a plurality of image portions according to a subdivision grid, wherein each encoded video stream comprises encoded images with at least one same corresponding respective image portion of said subdivision grid encoded with a higher resolution than the other image portions of the subdivision grid,
determining at least one image portion corresponding to said region of interest, and
transmitting at least one encapsulated encoded video stream corresponding to the at least one image portion determined.

12. The system according to claim 11, further comprising:
a third image processing device for processing video data for displaying a video stream, the third image processing device comprising a processing unit configured for:
transmitting to the second image processing device, a request for enhanced displaying of a region of interest in images of a video stream with a higher resolution than the remainder of said images,
receiving said at least one encapsulated encoded video stream, wherein each image of each at least one encoded video stream is subdivided into a plurality of image portions according to a subdivision grid, wherein each at least one encoded video stream comprises encoded images with at least one corresponding respective image portion of said subdivision grid encoded with a higher resolution than the other image portions of the subdivision grid, and wherein said at least one corresponding respective image portion of said subdivision grid corresponds to said region of interest,
extracting an encoded video stream from said at least one encapsulated encoded video stream received,
decoding said at least one encoded video stream, and
generating, based on at least one video stream obtained by said decoding, a video signal, wherein resolution in said region of interest in the images is higher than in the remainder of the images.

13. A non-transitory computer-readable storage medium storing a program causing a device to perform the method according to claim 1.

14. An image processing apparatus comprising:
an obtaining unit configured to obtain video data;
a generating unit configured to generate, by performing encoding processing on the video data obtained by the obtaining unit, a plurality of video streams each of which a specific region (ROI) encoded with a higher quality than a quality of other regions is different and a video stream of a base layer of which a whole image is encoded with a lower quality than the quality of the specific region, wherein each of the plurality of video streams each having the different specific region is decodable by using the video stream of the base layer; and
an encapsulating unit configured to encapsulate the plurality of video streams each having the different specific region and the video stream of the base layer into an encapsulation file comprising media data and metadata describing the media data based on a plurality of extractors which are set so that each of the plurality of video streams each having the different specific region refer to the video stream of the base layer as a common video stream,
wherein the encapsulation file is used in order to determine image portions that correspond to a region of interest,
wherein for the encapsulated encoded video streams each having the different specific region, each region being associated with resolution level data representing a level of resolution with which said each region is encoded and said resolution level data comprises superimposition data indicating a position of a data portion in a superimposition of image layers, and
wherein each region of the encapsulated encoded video stream having the different specific region is associated with location information indicating a position of the region in the subdivision grid.

15. The image processing apparatus according to claim 14, wherein the quality is a spatial resolution.

16. The image processing apparatus according to claim 14, wherein the specific region and the other regions of each of the encoded video streams are defined by using a subdivision grid.

17. The image processing apparatus according to claim 16, wherein said location information comprises:
coordinates of a starting point of the at least one same specific region, and dimension information representing a dimension of said at least one same specific region.

18. The image processing apparatus according to claim 16, wherein the encapsulating unit is configured to encapsulate, into said encapsulation file, the subdivided video data being encoded with a low resolution.

19. The image processing apparatus according to claim 16, wherein each one of the plurality of encoded video streams having the different specific region is encoded with an enhancement layer with said images with at least one same specific region of the subdivision grid encoded with a higher resolution than the other regions of the subdivision grid.

* * * * *